United States Patent [19]

Suzuki

[11] Patent Number: 5,410,613
[45] Date of Patent: Apr. 25, 1995

[54] PATTERN RECOGNIZING APPARATUS
[75] Inventor: Noriyuki Suzuki, Neyagawa, Japan
[73] Assignee: Matsushita Electric Industrial Co., Ltd., Osaka, Japan
[21] Appl. No.: 913,185
[22] Filed: Jul. 14, 1992
[30] Foreign Application Priority Data Jul. 17, 1991 [JP] Japan .................................. 3-176461

[51] Int. Cl.$^6$ .............................................. G06K 9/62
[52] U.S. Cl. ........................................ 382/14; 382/18; 382/25
[58] Field of Search ........................ 328/18, 16, 30, 36, 328/25, 42, 14

[56] References Cited

U.S. PATENT DOCUMENTS

| | | | |
|---|---|---|---|
| 4,288,779 | 9/1981 | Otsu et al. | 382/18 |
| 4,757,551 | 7/1988 | Kobayashi et al. | 382/18 |
| 4,941,192 | 7/1990 | Mishima et al. | 382/18 |
| 5,058,182 | 10/1991 | Kuan et al. | 382/25 |
| 5,127,063 | 6/1992 | Nishiya et al. | 382/42 |

*Primary Examiner*—Leo H. Boudreau
*Assistant Examiner*—D. B. Anderson
*Attorney, Agent, or Firm*—Wenderoth, Lind & Ponack

[57] ABSTRACT

A pattern recognizing apparatus includes an image pick-up device for picking up an image of a component for teaching and an image of a component to be recognized, and a feature value calculating device for calculating a feature value based on the image picked up by the image pick-up device. Also provided is a processing control device for outputting a teaching signal indicating a processing rule to be applied to the components for teaching, a histogram forming device for receiving the teaching signal and the feature value calculated based on the image of the component to be recognized and forming a histogram of the feature value of the rule based on the teaching signal and the received feature value, and a membership function forming device for forming a membership function which includes a noise eliminating device for performing linear interpolation to valleys of the histogram, and a threshold processing device for changing the histogram to a membership function through a threshold process. A calculating device is provided for finding a membership value based on the feature value calculated by the image of the component to be recognized based on the membership function formed by the membership function forming device, and calculating an acceptance of fit of the rule applied to the component to be recognized. A selecting device is provided for selecting a rule having the maximum acceptance of fit to decide a pattern of the component to be recognized. The apparatus calculates the acceptance of fit of a pattern on the basis of the membership value of the shape feature value, so that the membership function can be formed efficiently.

8 Claims, 5 Drawing Sheets

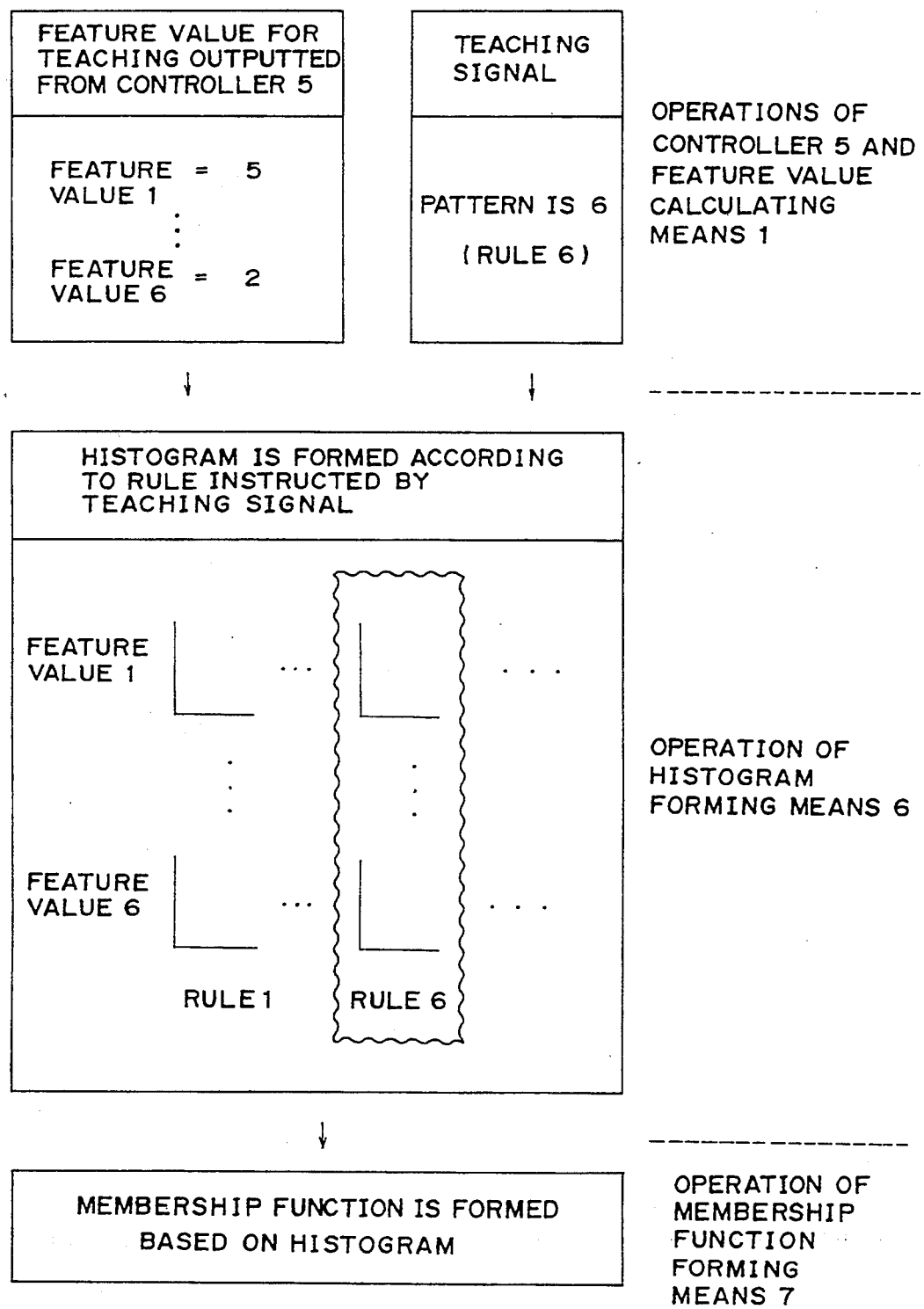

PATTERN RECOGNIZING APPARATUS

BACKGROUND OF THE INVENTION

The present invention generally relates to an image recognition apparatus used, for example, in factories and plants, and more particularly, to a pattern recognizing apparatus adapted to classify objects such as components through pattern matching of shape feature values of images.

A conventional pattern recognizing apparatus performs pattern recognition as follows. The average value of a shape feature value of reference patterns, such as an area, peripheral length or secondary moment of each reference pattern, and a respective standard deviation are obtained in advance. Then, the shape feature value of an image of the pattern of an object to be recognized is calculated and compared with that of the reference pattern, whereby the object is recognized.

The conventional pattern recognizing apparatus is based on the assumption that each kind of shape feature value varies in a normal distribution. However, in actuality, the variation of the shape feature value does not always assume a normal distribution. Therefore, the conventional apparatus often is unable to recognize certain patterns or often erroneously recognizes certain patterns.

Meanwhile, the present applicant has previously proposed a pattern recognizing apparatus utilizing fuzzy inference. This pattern recognizing apparatus will be described with reference to FIG. 5.

In FIG. 5, reference numeral 21 denotes a calculating means for calculating shape feature values of input images; 22 denotes a pattern deciding means; 23a-23n denote calculating means for calculating an acceptance of fit of respective rules thereof; and 24 denotes a rule selecting means for selecting a rule having a maximum acceptance of fit.

Initially, the calculating means 21 calculates shape feature values of an input image. More specifically, it calculates the shape feature value of each of suitably set image sections of the input image. The shape feature value of each section is input to the pattern deciding means 22, where a decision is made as to whether the input image is of an object to be recognized.

A plurality of production rules (IF-THEN rules) are set corresponding respectively to patterns of objects to be recognized in the pattern deciding means 22. The overall acceptance of fit of each production rule relative to the input shape feature values is obtained by fuzzy inference using membership functions provided in the condition part of each production rule for each input shape feature value. A rule having the maximum acceptance of fit is decided as corresponding to the subject pattern identified in the action part of the production rule.

In other words, the acceptance of fit of each membership function of each rule is obtained in the calculating means 23a-23n based on the output value of each membership function relative to the input shape feature values, and the overall acceptance of fit of a rule is found by summing the acceptance of fit of the membership functions of the rule.

Alternately, the minimum acceptance of fit of the membership functions of a rule may be designated as the overall acceptance of fit of the rule, or the acceptance of fit of the membership functions of a rule may be multiplied together to obtain the overall acceptance of fit of the rule.

Subsequently, the rule selecting means 24 selects the rule having the maximum overall acceptance of fit from among those obtained in the calculating means 23a-23n. The subject rule, i.e., the subject pattern is decided in the above-described manner.

In the above pattern recognizing apparatus, it is necessary to form the most suitable membership functions in order to realize optimum pattern recognition. However, forming of the membership functions based on the intuition and experience of a system designer is overly troublesome and inconvenient.

SUMMARY OF THE INVENTION

The object of the present invention is therefore to provide a pattern recognizing apparatus which eliminates the inconveniences of the prior apparatus and which is capable of efficiently forming membership functions.

In accomplishing these and other objects, according to one aspect of the present invention, there is provided a pattern recognizing apparatus comprising: an image pick-up means for picking up an image of a reference component for teaching and an image of a component to be recognized; a feature value calculating means for calculating a feature value based on the image picked up by the image pick-up means; a control means for outputting a teaching signal indicating a rule to be applied to the components for teaching; a histogram forming means for receiving the teaching signal and the feature value calculated based on the image of the component to be recognized and forming a histogram of the feature value of the rule based on the teaching signal and the received feature value; a membership function forming means for forming a membership function which includes a noise eliminating means for performing linear interpolation of valleys of the histogram, and a threshold processing means for changing the histogram to a membership function through a threshold process; a calculating means for finding a membership value based on the feature value calculated by the image of the component to be recognized based on the membership function formed by the membership function forming means, and calculating an acceptance of fit of the rule applied to the component to be recognized; and a selecting means for selecting a rule having the maximum acceptance of fit to decide a pattern of the component to be recognized.

According to the present invention, the shape feature value is calculated based on the image of the component to be recognized, and the membership function is formed based on the calculated feature value through the histogram. On the basis of the formed membership function, the membership value is found from the feature value calculated based on the image of the component to be recognized. The acceptance of fit of a rule applied to the component to be recognized is calculated to select the rule having the maximum acceptance of fit. Thus, a pattern of the component to be recognized is decided. Therefore, the histogram of the feature value of the rule is formed on the basis of the teaching signal, and valleys of the histogram are interpolated linearly to thereby correct the shape of the histogram through a threshold process, whereby the membership function is formed. Accordingly, the membership function which determines the pattern deciding ability of the apparatus can be known efficiently, thereby realizing superior performance in recognizing patterns.

When the membership function is modified, even though the image of the component to be recognized is picked up, the control means outputs the teaching signal indicating the rule applied to the component to be recognized to the histogram forming means. Then, the membership function is formed based on the feature value of the component to be recognized so as to modify the previously formed membership function.

BRIEF DESCRIPTION OF THE DRAWINGS

These and other objects and features of the present invention will become clear from the following description taken in conjunction with the preferred embodiment thereof with reference to the accompanying drawings in which:

FIG. 3 is a diagram for explaining the operation of the apparatus of FIG. 1 when a membership function is formed;

FIG. 4A is a diagram for explaining how the histogram is turned to a trapezoid, FIG. 4B is a diagram for explaining how the trapezoid histogram is turned to a membership function, and FIG. 4C is a diagram showing the membership function being corrected for the last time.

DETAILED DESCRIPTION OF THE PREFERRED EMBODIMENT

Figure 1:
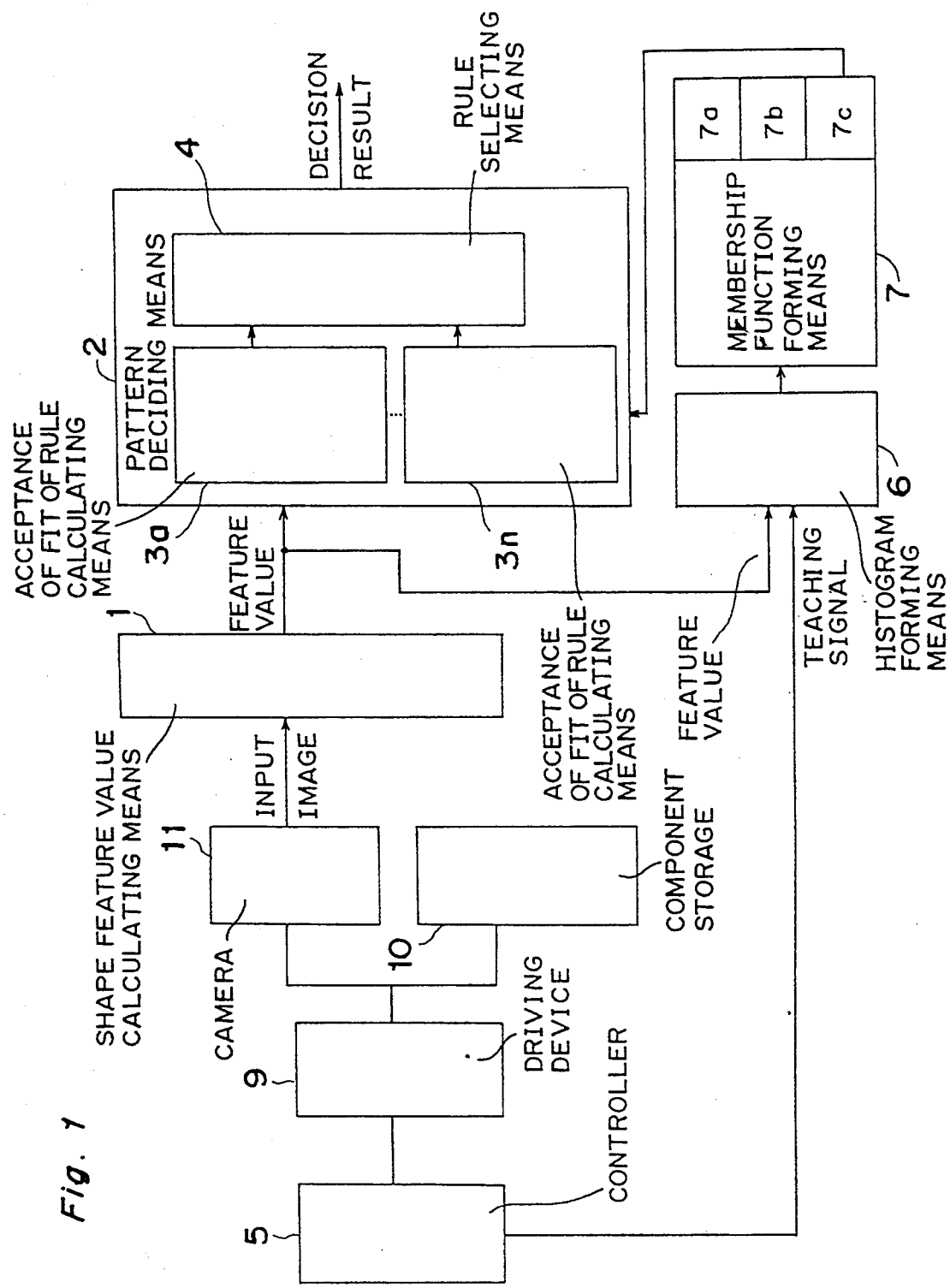
FIG. 1 is a schematic structural diagram of a pattern recognizing apparatus according to one embodiment of the present invention.

Before the description of the present invention proceeds, it is to be noted that like parts are designated by like reference numerals throughout the accompanying drawings.

A pattern recognizing apparatus according to one preferred embodiment of the present invention will be described hereinbelow with reference to the accompanying drawings.

FIG. 1 schematically shows the structure of a pattern recognizing apparatus of one embodiment of the present invention. The pattern recognizing apparatus in FIG. 1 has a feature value calculating means 1 for calculating a shape feature value of input images, and a pattern deciding means 2 which includes calculating means 3a–3b for calculating the overall acceptance of fit (goodness of fit) of each rule and a rule selecting means 4. The pattern recognizing apparatus is also provided with a camera 11 for picking up an image of a component, a controller 5, a histogram forming means 6, and a membership function forming means 7. The membership function forming means 7 includes a noise eliminating means 7a, a threshold processing means 7b, and a supplementary means 7c which are described later. The controller 5 outputs a teaching signal to the histogram forming means 6 and a driving signal to a driving device 9 for driving the camera 11 and/or a component held in a component storage 10 so as to pick up an image of the component using the camera 11. That is, based on the driving signal, the driving device 9 moves the camera 11 relative to the component to perform an image pickup operation using the camera 11.

The operation of the pattern recognizing apparatus will be described first. Various kinds of shape feature values of a target pattern of the component are calculated in the shape feature value calculating means 1. Concretely, the shape feature value of each image section which has been suitably set in the pattern is calculated. For the shape feature value of each section, for instance, an area, peripheral length, secondary moment, secondary moment in a direction of a shorter axis, and secondary moment in a direction of a longer axis can be used. The shape feature values of the image sections of the pattern are input to the pattern deciding means 2 to detect whether shape feature values fit the target pattern.

The operation of the pattern deciding means 2 will now be explained. The principal theory of the pattern deciding means 2 is represented by a formula (1) below.

IF feature value 1 IS $A_{11}$, feature value 2 IS $A_{12}$, ...
, THEN $B_1$

IF feature value 1 IS $A_{21}$, feature value 2 IS $A_{22}$, ...
, THEN $B_2$

IF feature value 1 IS $A_{n1}$, feature value 2 IS $A_{n2}$, ...
., THEN $B_n$ \hfill (1)

As indicated in the above formula (1), a plurality of production rules are constructed. The rules fundamentally correspond to respective target patterns to be recognized. In the formula (1), the overall acceptance fit of a rule relative to the input shape feature values is obtained by fuzzy inference using the membership functions provided in the condition part of the rule, namely, "IF feature value 1 IS $A_{11}$, IF feature value 1 IS $A_{21}$, . . ." A rule having the maximum overall acceptance of fit is employed to infer the action part identifying a target pattern, i.e., "THEN $B_n$". In other words, a pattern is recognized as a target pattern conforming to the rule having the maximum overall acceptance of fit. (It is decided, of course, that a target pattern is not present if the overall acceptance of fit of all the rules is zero.)

Figure 2:
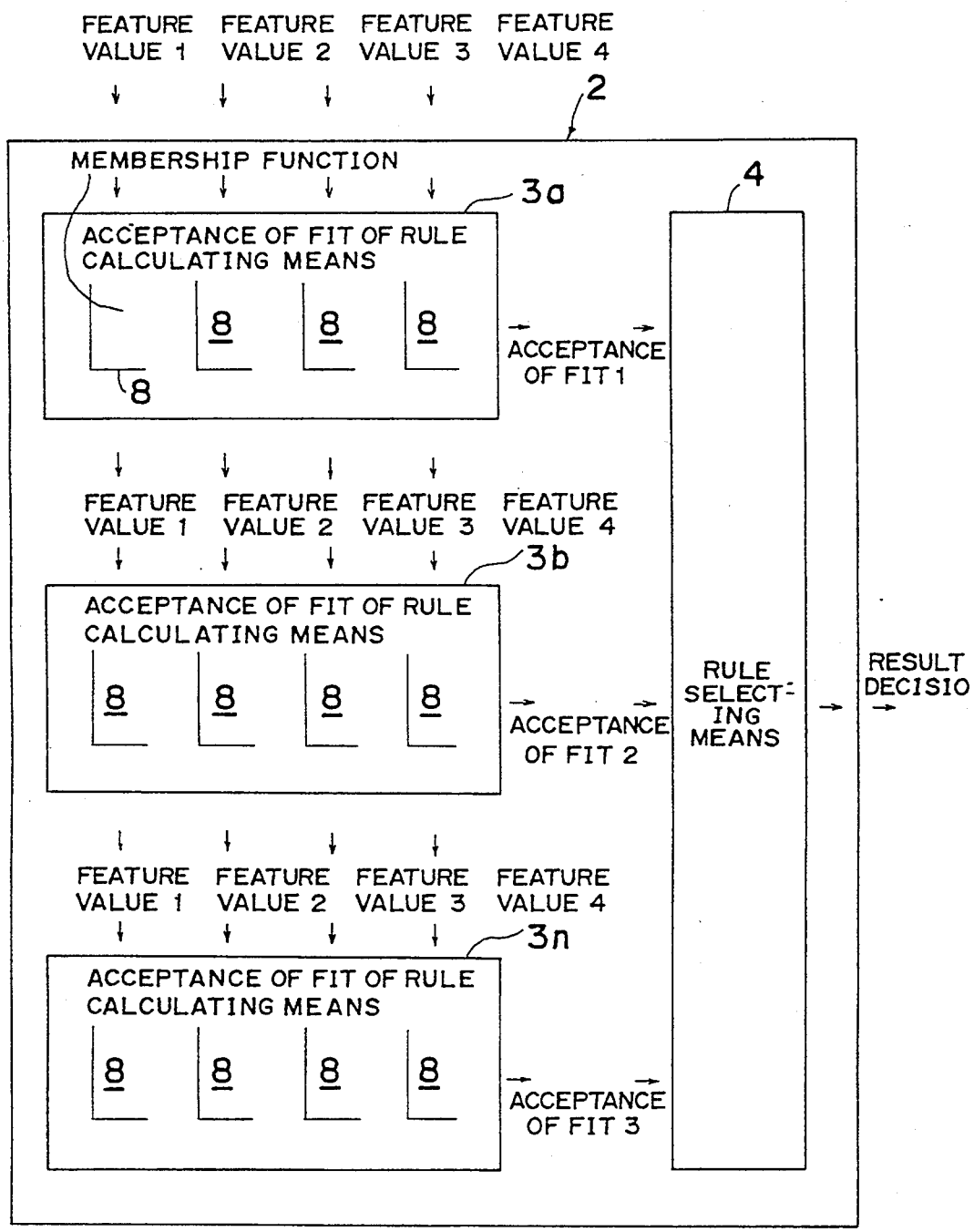
FIG. 2 is a structural diagram of a pattern deciding means of the apparatus of FIG. 1.

FIG. 2 shows the detailed structure of the pattern deciding means 2. In FIG. 2, reference numeral 8 indicates membership functions of each rule relatively corresponding to input shape feature values and used in the calculating means 3a–3n. The membership functions are formed in accordance with the membership function forming operation described later. The pattern deciding means 2 in FIG. 2 has an inference mechanism comprised of three rules to which are applied four kinds of shape feature values. The four kinds of the input feature values 1–4 are input to the three calculating means 3a, 3b, and 3n in parallel, where they are respectively referred to by the corresponding membership functions 8. The acceptance of fit of each membership function is obtained which is indicative of the extent to which each shape feature value is fit to the corresponding membership function. More particularly, the acceptance of fit of a membership function corresponds to an output value (membership value) of the membership function relative to the corresponding input feature value.

The overall acceptance of fit of each rule is obtained by summing the acceptance of fit of the membership functions of the rule. Alternatively, the minimum acceptance of fit of the membership functions of each rule is made the overall acceptance of fit of the rule. It is also possible to designate the overall acceptance of fit of each rule as the product of the acceptance of fit of the membership functions of the rule. The thus-calculated overall acceptance of fit of each rule is input to the rule selecting means 4 for deciding the pattern. The subject rule, namely, the target pattern is decided according to the rule having the maximum overall acceptance of fit.

The teaching operation of the membership functions which form the production rules will be described below with reference to an explanatory diagram of FIG. 3. The controller 5 outputs a driving signal to the driving device 9 to cause the camera 11 to pick up an image of a reference component used for teaching and outputs a teaching signal to the histogram forming means 6. The reference component used for teaching can be a component having a pattern which is clearly and previously decided. Alternately, the reference component used for teaching can be taken from a sample of components to be recognized. The teaching signal denotes, for example, the kind of reference component image being picked up by the camera 11, to thereby indicate an identifying number of the subject rule. The shape feature value calculating means 1 calculates the shape feature values based on the picked-up image of the reference component used for teaching and outputs a corresponding feature value signal to the histogram forming means 6. The identifying number of the subject rule for the histogram is made to coincide with the pattern decision result, which is 6 in the example of FIG. 3. The histogram forming means 6 adds data of the feature value of each component to the histogram of the feature value of the subject rule on the basis of the outputs from the controller 5. The histograms of the feature values are completed by performing the above procedure for each pattern (rule) a plurality of times. Thereafter, the membership function forming means 7 forms a membership function from the thus obtained histogram of the feature value.

Figure 4A:
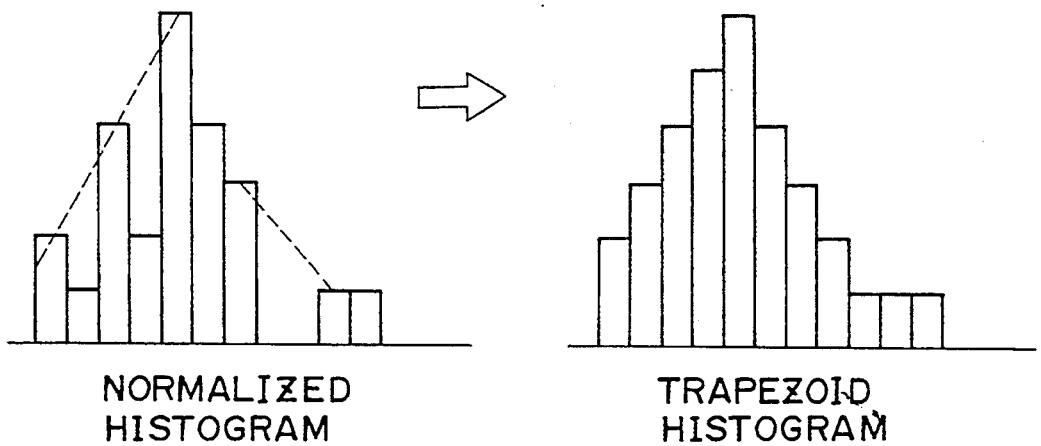
FIGS. 4A–4C depict the operation of forming the membership function from the histogram of the shape feature value, and more particularly.
Figure 4B:
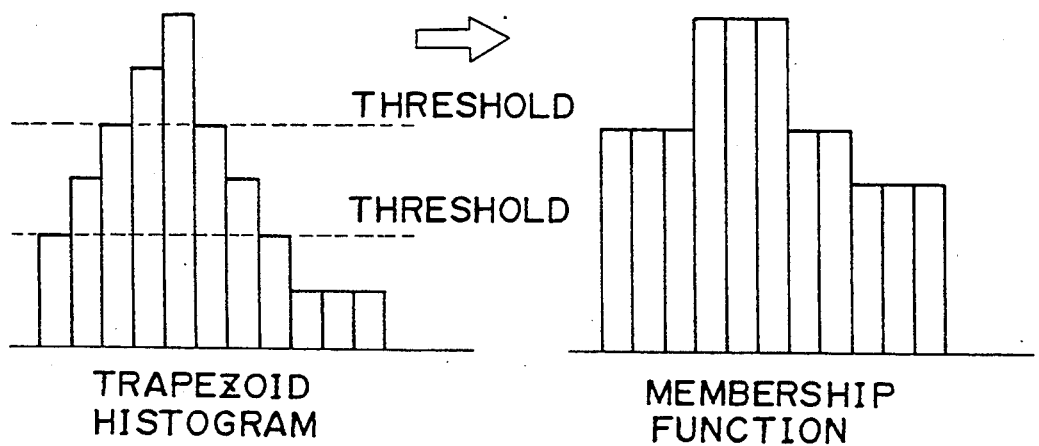
Figure 4C:
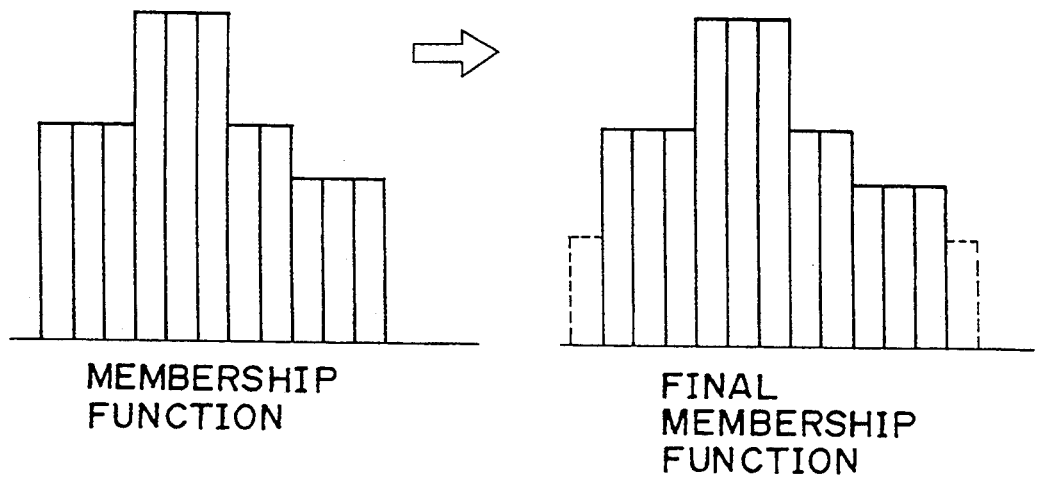
Figure 5:
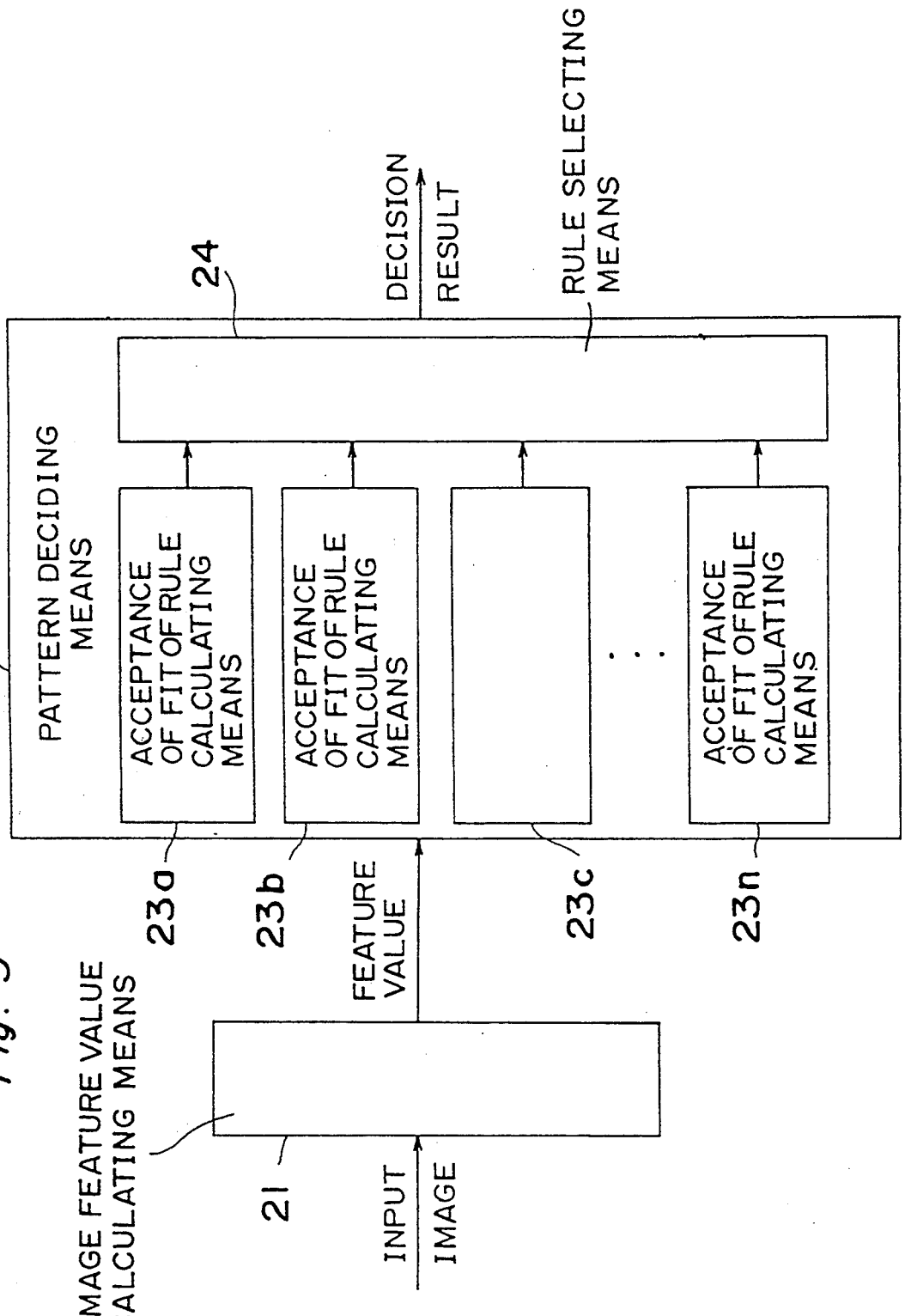
FIG. 5 is a schematic structural diagram of a conventional pattern recognizing apparatus.

The operation of the membership function forming means 7 when forming the membership function from the histogram of the feature values will bet discussed hereinafter. FIGS. 4A-4C are diagrams for explaining the forming operation of the membership function from the histogram of the feature values. As shown in FIG. 4A, the histogram is formed into a trapezoid by the noise eliminating means 7a. In other words, valleys of the histogram are subjected to linear interpolation in the case where the histogram does not exhibit a simple increase, a peak value, and a simple decrease. This is to remove noise components from the histogram. Then, the histogram is changed to a membership function through a threshold process by the threshold processing means 7B as shown in FIG. 4B. Although the histogram at this time represents the frequency probability, the membership function is the acceptance of fit to input values, not reflecting the frequency probability. In other words, since the acceptance of fit is high to some extent in many cases even when the frequency probability is low, a part of the histogram where the frequency probability is low is raised in the threshold process. Thereafter, a supplementary process is performed by the supplementary means 7c. That is, a value of low degree is added to either side of the formed membership function by the supplementary means 7c, as in FIG. 4C, in order to process the data not sampled during the formation of the histogram.

As described hereinabove, according to the embodiment, the membership function is formed according to a method in which the histogram of the feature values of the subject rule is formed on the basis of teaching signals outputted from a controller, valleys of the histogram are subjected to linear interpolation and the histogram is corrected through a threshold process. Therefore, the membership function can be formed efficiently while the asymmetric shape of the histogram in the right-an-left direction is maintained. Accordingly, the pattern recognizing apparatus of the embodiment is highly capable of deciding patterns.

A modification of the embodiment is described below. The control means 5 also can output a teaching signal indicating a rule applied to the component to be recognized when the membership function is modified. Thereby, even though the component to be recognized is picked up by the image pick-up means 11, when the control means 5 outputs the teaching signal indicating a rule applied to the component to be recognized to the histogram forming means 6, the membership function is formed based on the feature value of the component to be recognized so as to modify the previously formed membership function.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A pattern recognizing apparatus comprising:
   an image pick-up device;
   means for causing the image pick-up device to view a reference component to obtain a first image and to view a component to be recognized to obtain a second image;
   a feature value calculating means for calculating at least three shape feature values of each of the first image and the second image picked up by said image pick-up means;
   a control means for generating three teaching signals indicative of three fuzzy inference rules associated with the reference component;
   a histogram forming means for receiving the teaching signals from said control means and the three pre-defined shape feature values of the first image calculated by said feature value calculating means, and for forming three histograms of the three pre-defined shape feature values;
   a membership function forming means for forming three membership functions of the fuzzy inference rules indicated by the teaching signals based on the three histograms formed by said histogram forming means, said membership function forming means including noise eliminating means for performing linear interpolation at valleys of each histogram formed by said histogram forming means, and three threshold processing means for effecting three kinds of threshold processes to change the histogram resulting from the linear interpolation to each membership function;
   pattern deciding means for receiving from said feature value calculating means the three pre-defined shape feature values of the second image so as to recognize the component to be recognized, said pattern deciding means including acceptance of fit calculating means for determining an overall acceptance of fit of the three fuzzy inference rules by applying the received three pre-defined shape feature values to the three fuzzy inference rules, the three fuzzy inference rules composed of the three membership functions formed by said membership function forming means and each provided for a respective type of component to be recognized, and said pattern deciding means further including a selecting means for selecting one of the three fuzzy inference rules having a maximum overall acceptance of fit, wherein the component to be recognized is deemed to correspond to a pattern identified by the selected fuzzy inference rule.

2. The pattern recognizing apparatus as claimed in claim 1, wherein said membership function forming means further includes means for effecting a supplementary process in which each membership function obtained by each threshold processing means is adjusted with respect to values of a low degree not accounted for in the formation of each histogram.

3. The pattern recognizing apparatus as claimed in claim 1, wherein said control means outputs each teaching signal when each previously formed membership function is to be modified, and wherein said histogram forming means and said membership function forming means modify each previously formed membership function based on each teaching signal and based on a received shape feature value of said second image of said object to be recognized.

4. The pattern recognizing apparatus as claimed in claim 2, wherein said control means outputs each teaching signal when each previously formed membership function is to be modified, and wherein said histogram forming means and said membership function forming means modify each previously formed membership function based on each teaching signal and based on a received shape feature value of said second image of said object to be recognized.

5. A pattern recognizing apparatus for determining whether a component to be recognized corresponds to any one of at least three reference components, said apparatus comprising:
   a camera;
   a drive device which moves the camera relative to the component to be recognized and the at least three reference components;
   a controller, operatively coupled to said drive device, for applying a drive signal to said drive device to cause the camera to view the at least three reference components to obtain at least three respective first images and to view the component to be recognized to obtain a second image, and for generating a teaching signal identifying a fuzzy inference rule of a reference component associated with each obtained first image;
   a feature value calculating means for calculating at least one pre-defined shape feature value of each of the at least three respective first images and the second image obtained by said camera;
   a histogram forming means for receiving the teaching signal from said control means and the at least one pre-defined shape feature value of each of the at least three respective first images calculated by said feature value calculating means, and for forming at least three histograms respectively from the at least one pre-defined shape feature values for the at least three respective first images;
   a membership function forming means for forming at least three membership functions of at least three respective fuzzy inference rules identified by the teaching signal based on the respective at least three histograms formed by said histogram forming means, said membership function forming means including noise eliminating means for performing linear interpolation at valleys of each histogram formed by said histogram forming means, and threshold processing means for effecting a threshold process to change each histogram resulting from the linear interpolation into a corresponding membership function;
   pattern deciding means for receiving from said feature value calculating means the at least one pre-defined shape feature value of the second image so as to recognize the component to be recognized, said pattern deciding means including acceptance of fit calculating means for determining an overall acceptance of fit of each of the at least three fuzzy inference rules by applying the received at least one pre-defined shape feature value to each of the at least three fuzzy inference rules, each of the at least three fuzzy inference rules composed of at least one membership function formed by said membership function forming means and each provided for a respective component to be recognized, and said pattern deciding means further including a selecting means for selecting one of the at least three fuzzy inference rules having a maximum overall acceptance of fit, wherein the component to be recognized is deemed to correspond to a pattern identified by the selected fuzzy inference rule.

6. The pattern recognizing apparatus as claimed in claim 5, wherein said membership function forming means further includes means for effecting a supplementary process in which each membership function obtained by said threshold processing means is adjusted with respect to values of a low degree not accounted for in the formation of the histogram.

7. The pattern recognizing apparatus as claimed in claim 5, wherein said control means outputs said teaching signal when a previously formed membership function is to be modified, and wherein said histogram forming means and said membership function forming means modify the previously formed membership function based on said teaching signal and based on a received shape feature value of said second image of said object to be recognized.

8. The pattern recognizing apparatus as claimed in claim 6, wherein said control means outputs said teaching signal when a previously formed membership function is to be modified, and wherein said histogram forming means and said membership function forming means modify the previously formed membership function based on said teaching signal and based on a received shape feature value of said second image of said object to be recognized.

* * * * *